(12) United States Patent
Leblanc et al.

(10) Patent No.: US 8,935,973 B2
(45) Date of Patent: Jan. 20, 2015

(54) BEVELLING APPARATUS FOR PIPE RE-FACING MACHINE

(76) Inventors: Colin Denis Leblanc, Meteghan River (CA); William Anthony Spurrell, Calgary (CA); Vincent Joseph Stuart, Meteghan Centre (CA); Robert Flynn, Meteghan Station (CA)

( * ) Notice: Subject to any disclaimer, the term of this patent is extended or adjusted under 35 U.S.C. 154(b) by 555 days.

(21) Appl. No.: 13/353,553

(22) Filed: Jan. 19, 2012

(65) Prior Publication Data

US 2012/0180609 A1  Jul. 19, 2012

Related U.S. Application Data

(60) Provisional application No. 61/434,232, filed on Jan. 19, 2011.

(51) Int. Cl.
*B23B 5/16* (2006.01)
*B23B 3/26* (2006.01)

(52) U.S. Cl.
CPC .. *B23B 5/167* (2013.01); *B23B 3/26* (2013.01)
USPC .................. 82/113; 82/128; 82/123

(58) Field of Classification Search
CPC ........................................ B23B 5/16
USPC .................... 82/113, 128, 123, 131
See application file for complete search history.

(56) References Cited

U.S. PATENT DOCUMENTS

| | | | | |
|---|---|---|---|---|
| 2,383,050 A | * | 8/1945 | Esson | 82/1.4 |
| 4,149,436 A | | 4/1979 | Blattler | |
| 4,387,612 A | * | 6/1983 | Eckle et al. | 82/131 |
| 4,422,356 A | * | 12/1983 | Pertle | 82/158 |
| 4,433,598 A | * | 2/1984 | Murray | 82/131 |
| 4,437,366 A | * | 3/1984 | Astle | 82/113 |
| 6,050,161 A | * | 4/2000 | Tremblay | 82/113 |
| 6,189,425 B1 | * | 2/2001 | Ricci et al. | 82/113 |
| 2001/0045146 A1 | * | 11/2001 | Fisher et al. | 82/113 |
| 2010/0257981 A1 | * | 10/2010 | Frick | 82/113 |
| 2011/0041658 A1 | * | 2/2011 | Weinberg et al. | 82/113 |

FOREIGN PATENT DOCUMENTS

| | | | | |
|---|---|---|---|---|
| GB | 2240735 A | * | 8/1991 | |
| JP | 05177402 A | * | 7/1993 | |
| JP | 07051911 A | * | 2/1995 | |
| JP | 2001353605 A | * | 12/2001 | |

* cited by examiner

*Primary Examiner* — Daniel Howell
*Assistant Examiner* — Nicole N Ramos
(74) *Attorney, Agent, or Firm* — Donald V. Tomkins (57) ABSTRACT

In an improvement to a pipe re-facing machine having a rotatable flange plate and a coaxially-mounted collar rotatable with and longitudinally movable relative to the flange plate, a support bracket projects from the flange plate, and a support block is retainingly mounted to and movable relative to the support bracket in an angled radial direction. The support block is adapted to receive a tool holder carrying a cutting element. An actuating mechanism is engageable with the support block such that longitudinal movement of the collar will move the support block relative to the support bracket. The actuating mechanism can thus move the cutting element in an angled direction relative to the axis of a tubular workpiece, thereby enabling machining of a bevelled edge on an annular shoulder of a tubular workpiece non-rotatably mounted to the re-facing machine by longitudinally moving the collar while rotating the flange plate.

18 Claims, 10 Drawing Sheets

(Bottom View)

BEVELLING APPARATUS FOR PIPE RE-FACING MACHINE

CROSS-REFERENCE TO RELATED APPLICATIONS

This application claims the benefit, pursuant to 35 U.S.C. 119(e), of U.S. Provisional Application No. 61/434,232, filed on Jan. 19, 2011, and said provisional application is incorporated herein by reference in its entirety for continuity of disclosure.

FIELD OF THE DISCLOSURE

The present disclosure relates in general to apparatus for re-facing the seal faces of tubular workpieces such as drill pipe and drill collars, and in particular to apparatus for bevelling the perimeter edges of the seal faces of such workpieces.

BACKGROUND

Oil wells and gas wells are typically drilled into the ground by rotating a "drill string" made up of multiple sections (or "joints") of drill pipe connected end-to-end by means of threaded joints, with a suitable drill bit attached to the bottom of the drill string. The drill string typically incorporates heavier tubular members known as heavyweight pipe or drill collars, positioned between the drill bit and the assembly of pipe sections, in order to increase the vertical load on the drill bit and thus enhance its operational effectiveness. Drilling fluid (or "mud" as it is commonly referred to in the industry) is circulated under pressure downward through the drill string and out through ports in the drill bit, and upward to the surface via the annulus between the drill string and the wellbore.

A typical drill collar is fabricated with a "pin end" having a tapered external (i.e., male) thread, and a "box end" having a tapered internal (i.e., female) thread for mating engagement with the pin end of another drill pipe section or drill collar. As well, each pin end of the drill collar is formed with an annular shoulder adjacent the base of the male thread, and the outer face of each box end of the drill collar is formed with a corresponding annular shoulder. When a drill collar connection is "made up" by threading the pin end of one collar into the box end of another collar, the annular shoulders of the pin end and box end are brought into compressive metal-to-metal contact so as to create a mechanical seal preventing leakage of drilling mud. Because of this important function, the annular shoulders of the pin and box ends of the drill collars may alternatively be referred to as "seal shoulders" or "torque shoulders", and the contact surface of a torque shoulder may be referred to as a "seal face".

In order for torque shoulders to serve their sealing function as effectively as possible, the seal faces should ideally be uniformly planar and precisely perpendicular to the longitudinal axis of the drill string, and the seal faces should ideally be very smooth, and free from even minor damage or defects.

It is also customary and highly preferred to chamfer or bevel the outer circumferential edges of the seal faces (typically at an angle of approximately 45 degrees), primarily to protect the seal faces from damage during shipping and handling of the drill collars as well as from impact damage that could otherwise occur in the outer regions of the seal faces after a drill collar assembly has been made up and put into service. Although the angled faces of the bevelled edges do not come into contact with other components and do not have a direct sealing function, these angled faces as well should ideally be smooth and free from defects, for reasons discussed later in this document.

Unfortunately, the seal faces and bevelled edges of drill collars and other oilfield tubular items are commonly damaged due to rough handling, accidental impacts, and other incidents of typical well-drilling operations and the sometimes harsh environments in which these operations are conducted. Even minor damage to a seal face, such as scratches and nicks, can significantly impair the effectiveness of the mechanical seal between mating seal faces, to the point where there is no practical option except to replace the damaged tubular and, if possible, to re-face the damaged tubular to restore the stringent seal face requirements discussed above (to facilitate or enable later re-use in the field). Because of these stringent requirements, re-facing of torque shoulders must be carried out with great precision, and one way to do so is to ship the damaged tubulars to a machine shop at an off-site location. However, that is not an ideal option due to transportation costs and lost field production time, and/or the need to have an on-site stock of replacement tubulars, ready for installation while the damaged tubulars are being re-faced in the shop.

A number of machines have been devised for re-facing damaged tubulars in the field, to avoid the cost and inconvenience of shipping them to a machine shop. One particularly good example of such a machine is disclosed in U.S. Pat. No. 4,149,436 (Blattler), which is incorporated herein by reference, and corresponding Canadian Patent No. 1,080,948. The Blattler machine provides a threaded mandrel adapted to receive either the pin end or box end of a tubular workpiece such as a drill collar, the other end of which is supported by a suitable steady rest or other support means. The mandrel and the workpiece are stationary (i.e., non-rotating) during operation of the machine. A cylindrical shaft coaxially disposed around the mandrel rotates a flange plate onto which a tool holder is mounted, with the tool holder being radially movable toward or away from the longitudinal axis of the shaft (and, in turn, toward or away from the workpiece). Biasing means, in the form of a helical spring, is provided to bias the tool holder inward toward the workpiece axis.

The Blattler machine incorporates a wedge mechanism that engages the tool holder such that longitudinal movement of the wedge relative to the cylindrical shaft and toward the tool holder has the effect of displacing the tool holder radially away from the workpiece axis. As may be best seen in FIG. 2 in U.S. Pat. No. 4,149,436, the Blattler machine includes a collar assembly (85) which coaxially surrounds and rotates with a hollow shaft (48), which in turn is coaxially disposed around a non-rotating adapter (14) to which a tubular workpiece may be mounted. The collar (85) is axially slidable relative to the adapter and the rotary tool head (60), which is not axially movable relative to the adapter. A first wedge mechanism component ("wedging member 95") is mounted in association with the sliding collar (85), and a second wedge mechanism component ("actuating arm 84") is mounted to a tool holder (62), which in turn is mounted to the rotary tool head (60) so as to be radially movable relative thereto. The actuating arm (84) extends over and engages a sloping surface of the wedging member (95) such that axial movement of the collar (85) toward the rotary tool head (60) will cause radially outward movement of the actuating arm (84) and, in turn, the tool holder (62), and vice versa.

This apparatus is typically set up in an initial position such that a cutting tool mounted to the tool holder is positioned radially clear of the workpiece but longitudinally positioned to cut a desired depth into the torque shoulder of the mounted end of the workpiece. The cylindrical shaft is then rotated, thus also rotating the faceplate and the tool holder about the non-rotating workpiece. The wedge mechanism can then be gradually withdrawn longitudinally away from the workpiece, such that the rotating cutting tool progresses radially inward and machines a new seal face, removing any previously existing damage or defects.

In order to re-face the bevelled edge of the torque shoulder, a separate tool holder is mounted to the flange plate of the machine, with a bevelling tool having a cutting edge oriented to match the desired bevel angle. The radial position of this separate tool holder is pre-set and does not change during re-facing of the torque shoulder edge. With the seal face re-facing tool positioned away from the workpiece (by suitable manipulation of the previously-discussed wedge mechanism), and with the bevelling tool radially positioned for alignment with the torque shoulder edge, the rotating cylindrical shaft is moved longitudinally, over the stationary mandrel, toward the workpiece, such that the bevelling tool engages and re-faces the bevelled edge of the torque shoulder.

In accordance with the operational principles described above, the Blattler machine re-faces the face of the torque shoulder by moving the corresponding cutting tool across and parallel to the seal face, which facilitates the production of a suitably smooth machined surface. However, re-facing of the bevelled edge of the torque shoulder is accomplished by what may be referred to as a plunge cut, meaning that the cutting tool is plunged or forced against and into the workpiece. This process is not conducive to production of an optimally smooth machined bevel surface. Using this process, the cutting tool is susceptible to intermittently catching or bouncing on the workpiece surface due to factors such as mandrel flex or "backlash" resulting from an excessive plunge rate. This can cause what is commonly referred to in machining parlance as "chatter", which in turn causes the cutting tool to create gouges or other defects in the bevel surface. Such defects in the bevel surface are highly undesirable, particularly because if they occur near the inner perimeter of the bevel surface they can also create unacceptable defects in the seal face. In that event, re-facing of the seal face may have to be repeated.

It is clearly desirable, therefore, to re-face the bevel edges of torque shoulders using means that do not involve "plunging" motion of the cutting tool, in order to avoid chatter and resultant workpiece damage. Ideally, this operation would be carried out by moving a cutting tool across and parallel to the bevel face, in a manner analogous to the re-facing of torque shoulders as accomplished using the Blattler machine. Unfortunately, the Blattler machine as disclosed in U.S. Pat. No. 4,149,436 cannot carry out this mode of operation, and it is apparent that there are no other known machines or apparatus that are capable of re-facing the bevel edge of a torque shoulder in this desirable fashion.

Accordingly, there is a need for methods and apparatus for machining or re-facing a circumferential bevel edge on the end of a tubular member using a cutting tool that moves across and parallel to the face of the bevel. There is a further need for apparatus that is capable of carrying out such a bevel re-facing operation and is also adaptable for retrofitting onto re-facing machines that provide for only radial movement of the cutting tool relative to a tubular workpiece.

BRIEF SUMMARY

The present disclosure teaches embodiments of an improvement in a pipe-refacing machine of the general type having:

a tubular shaft rotatable about a rotational axis;

a flange plate mounted to and rotatable with one end of the tubular shaft and rotatable therewith, with the flange plate having an outer face perpendicular to the rotational axis and also having an opening through which the rotational axis passes;

a stationary and non-rotatable adapter disposed at least partially within the tubular shaft proximal to the opening in the flange plate, for receiving a threaded end of a tubular workpiece such that the longitudinal axis of the workpiece is coincident with the rotational axis; and a tubular collar coaxially disposed around the tubular shaft so as to be rotatable therewith and movable relative thereto in a direction parallel to the rotational axis.

In broad terms, the improvement comprises:

a support bracket projecting from the outer face of the flange plate;

a support block adapted to receive a tool holder, with the support block being retainingly mounted to the support bracket so as to be movable relative to the support bracket in an angled radial direction forming an acute angle relative to a radially-outermost portion of the flange plate, and with the acute angle corresponding to the bevel angle of a bevelled edge to be machined or re-faced on an annular shoulder of a tubular workpiece mounted to the adapter; and actuating means for effecting angled radial movement of the support block relative to the support bracket.

In one embodiment, the support bracket comprises a base plate having a raised section contoured for sliding engagement with a mating recess in the support block. In one variant of this embodiment, the raised section is in the form of a parallelepiped of trapezoidal cross-section.

In another embodiment, the support bracket comprises a contoured rail member oriented parallel to the desired bevel angle to be machined on an annular shoulder of a tubular workpiece, and the support block comprises a runner block contoured for retainingly mating engagement with the rail member so as to be movable along the rail member.

In one variant, the actuating means comprises an actuator arm operatively engageable with the support block, with the actuator arm being connected to a slide bracket extending through and radially movable within a radial slot through the flange plate. The slide bracket has a first wedge component operatively engageable with a second wedge component associated with the tubular collar, such that longitudinal movement of the tubular collar (i.e., parallel to the rotational axis) will cause the second wedge component to urge the first wedge component and the slide bracket in a radial direction, thereby causing the actuator arm to move the support block relative to the support bracket. The actuator arm may be formed with an angled outer section disposed between a pair of guide rollers associated with the support block, such that actuator arm remains effective to move the support block in either direction while the angled outer section is movable between the guide rollers transverse to the direction of travel of the support block, to accommodate the angled (or bi-directional) movement of the support block in response to uni-directional (i.e., longitudinal) movement of the tubular collar.

In another variant, the actuating means comprises a rigid actuator bar extending through a radial slot in the flange plate, with the one end of the actuator bar being swivellingly mounted to the support block and the other end of the actuator bar being swivellingly mounted to the tubular collar, such that longitudinal movement of the tubular collar will cause the actuator bar to move the support block relative to the support bracket. The swivelling connections of the actuator bar accommodate angled movement of the support block in response to longitudinal movement of the tubular collar.

Optionally, biasing means may be provided to bias the support block in an angled radial direction away from the rotational axis (i.e., such that the a cutting tool mounted to a tool holder mounted to the support block will be biased away from a workpiece mounted to the adapter). By way of non-limiting example, the biasing means may comprise a helical spring.

BRIEF DESCRIPTION OF THE DRAWINGS

Embodiments will now be described with reference to the accompanying figures, in which numerical references denote like parts, and in which.

DETAILED DESCRIPTION

Figure 1:
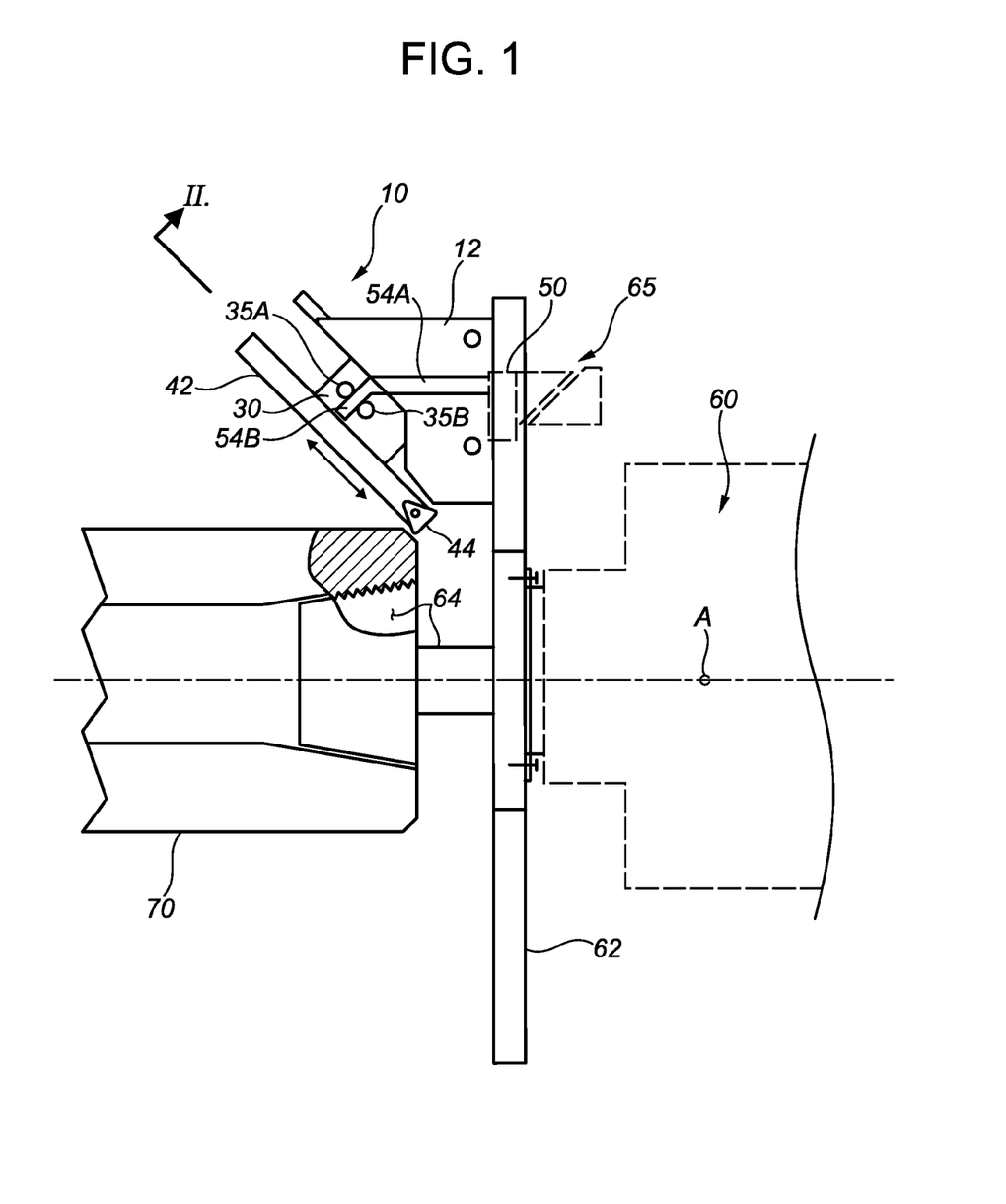
FIG. 1 is a schematic side view of a tubular workpiece mounted to a prior art re-facing machine, with a first embodiment of a bevelling apparatus in accordance with the present disclosure mounted in association with the flange plate of the re-facing machine.

As generally depicted in FIG. 1, a first embodiment of a bevelling apparatus in accordance with the present disclosure (and indicated in FIG. 1 by reference numeral 10) is mounted to the rotatable flange plate 62 of a re-facing machine 60, such that bevelling apparatus 10 is movable radially relative to the rotational axis A of re-facing machine 60. Re-facing machine 60 has a non-rotating mandrel 64 having a longitudinal axis coincident with axis A and adapted to coaxially engage a tubular workpiece 70 and to hold it stationary (i.e., non-rotating) while flange plate 62 rotates. The configuration of the workpiece-engaging end of mandrel 64 depends on the workpiece 70; for example, mandrel 64 would have tapered male threading to engage the box end of a drill collar (as in FIG. 1) or, alternatively, tapered female threading to engage the pin end of a drill collar.

Figure 8A:
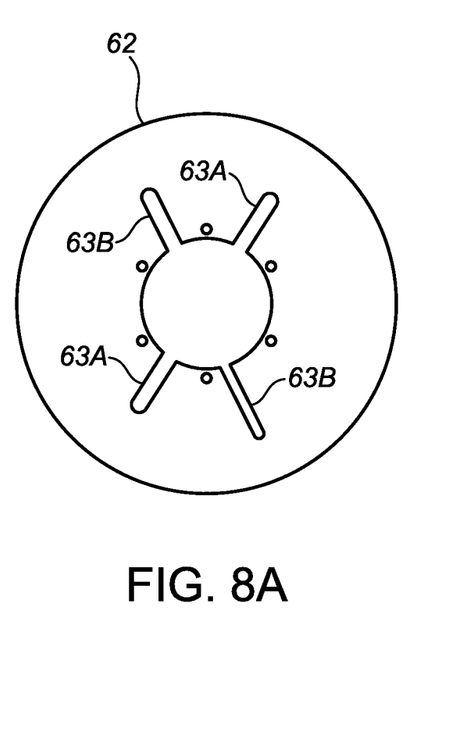
FIG. 8A is a more detailed end view of the flange plate of a re-facing machine having radial slots for receiving both a seal face cutter and a bevel cutter.

As may be understood from FIGS. 1 and 8A in particular, a radial movement mechanism 65 is radially movable within a radial slot 63A or 63B in flange plate 62 of re-facing machine 60. Radial movement mechanism 65 (which does not form part of the broadest embodiments of the bevelling apparatus) may comprise a wedge mechanism as in U.S. Pat. No. 4,149,436, or any other suitable mechanism capable of providing controllable radial movement relative to re-facing machine 60. As will be explained in greater detail below, bevelling apparatus 10 is coupled to radial movement mechanism 65, on the workpiece side of flange plate 62, such that actuation of radial movement mechanism 65 will produce corresponding radial movement of bevelling apparatus 10.

In the embodiment more particularly illustrated in FIGS. 2 through 6, bevelling apparatus 10 includes a mounting bracket comprising a bracket assembly 20 with a pair of side plates 12 rigidly connected (such as by welding) to opposing side edges 21A and 21B of bracket assembly 20 as shown. Bracket assembly 20 has an outer end 20A and an inner end 20B. Bracket assembly 20 comprises a base plate 22 plus a raised section 24 in the general form of a parallelepiped having a trapezoidal cross-section, with the wider portion of raised section 24 being disposed above and parallel to upper surface 22U of base plate 22. The trapezoidal configuration of raised section 24 is a matter of design preference, and is not essential; in alternative embodiments, raised section 24 could have a different cross-sectional configuration without departing from the scope of the present disclosure.

Figure 4:
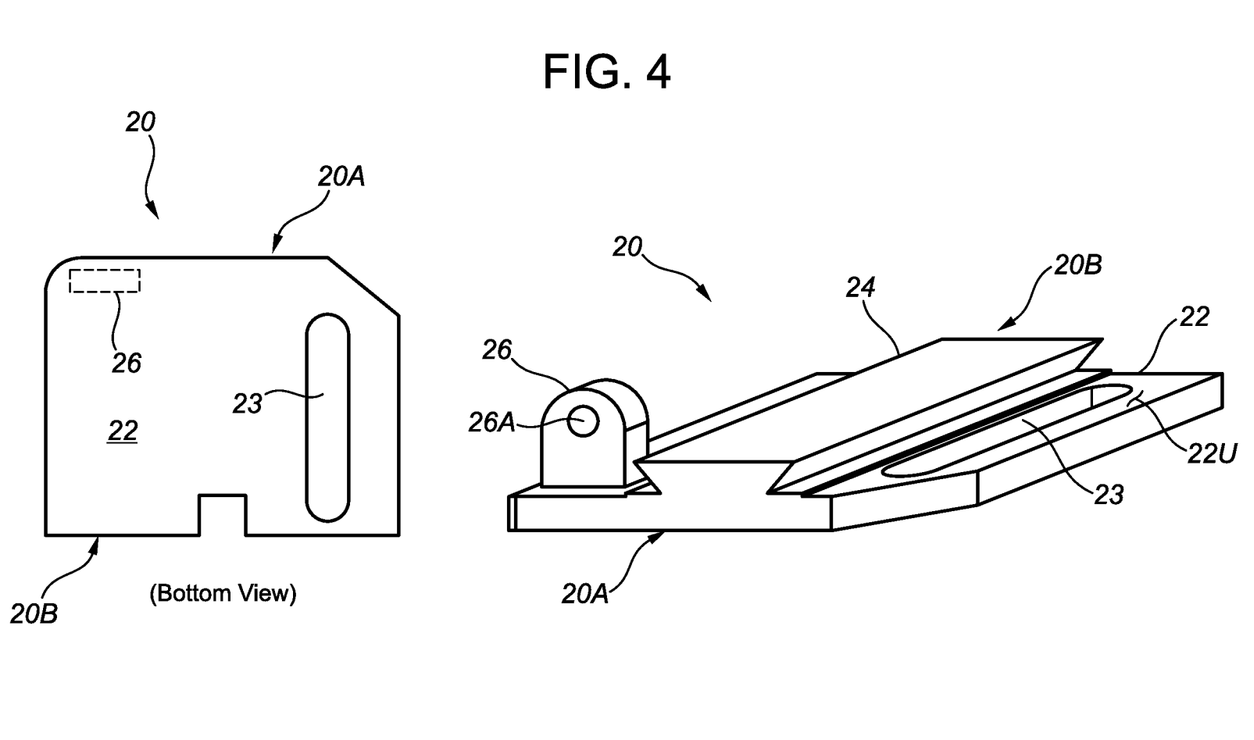
FIG. 4 illustrates the bracket assembly of the bevelling apparatus.

Raised section 24 extends approximately between outer end 20A and inner end 20B of bracket assembly 20. Base plate 22 has an elongate slot 23 adjacent and parallel to one side of raised section 24. On the other side of raised section 24, proximal to outer end 20A of bracket assembly 20, base plate 22 has an outer lug member 26 projecting above upper surface 22U, with a typically unthreaded bore 26A. Bracket assembly 20 is suitably adapted for secure mounting to flange plate 62 of re-facing machine 60.

Figures 5, 5A:
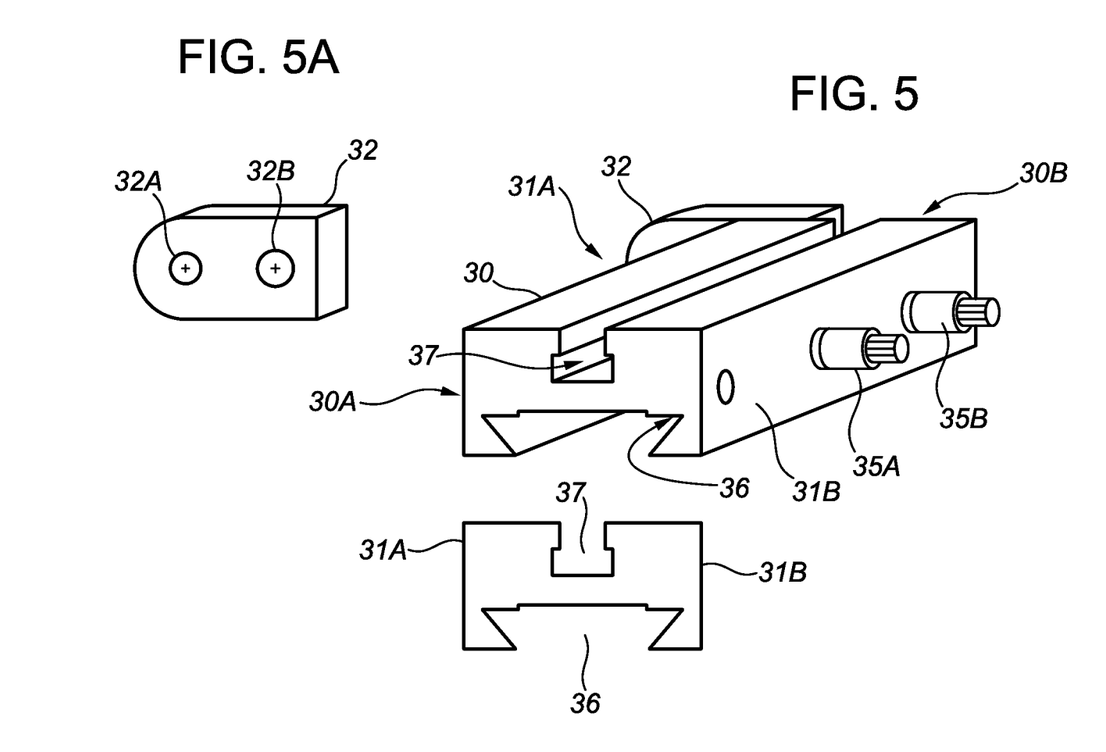
FIG. 5 illustrates the sliding tool-support block of the bevelling apparatus.
FIG. 5A illustrates one alternative form of the inner lug member shown in FIG. 5.
Figure 6:
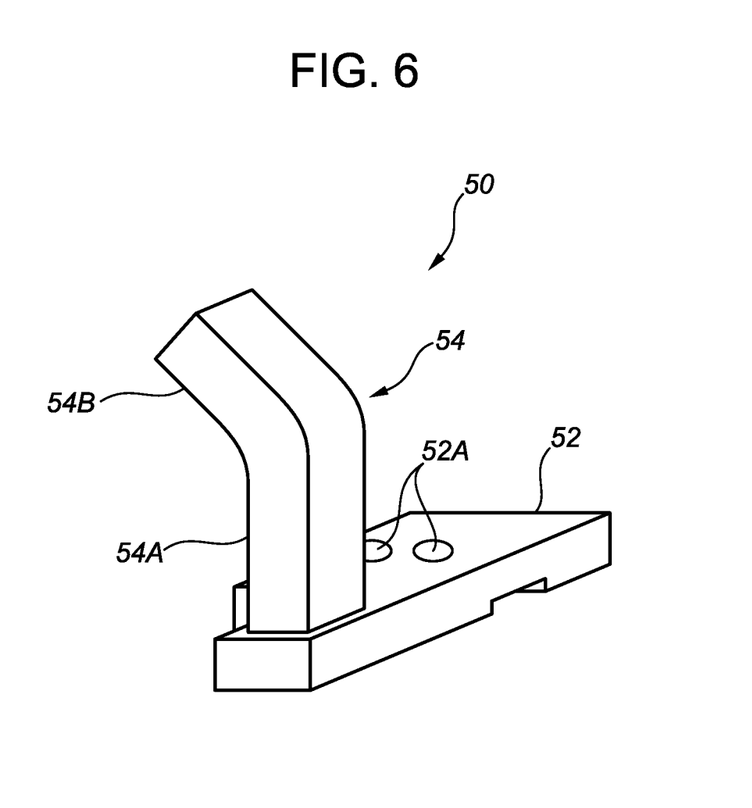
FIG. 6 illustrates the tool slide actuator of the bevelling apparatus.
Figure 7A:
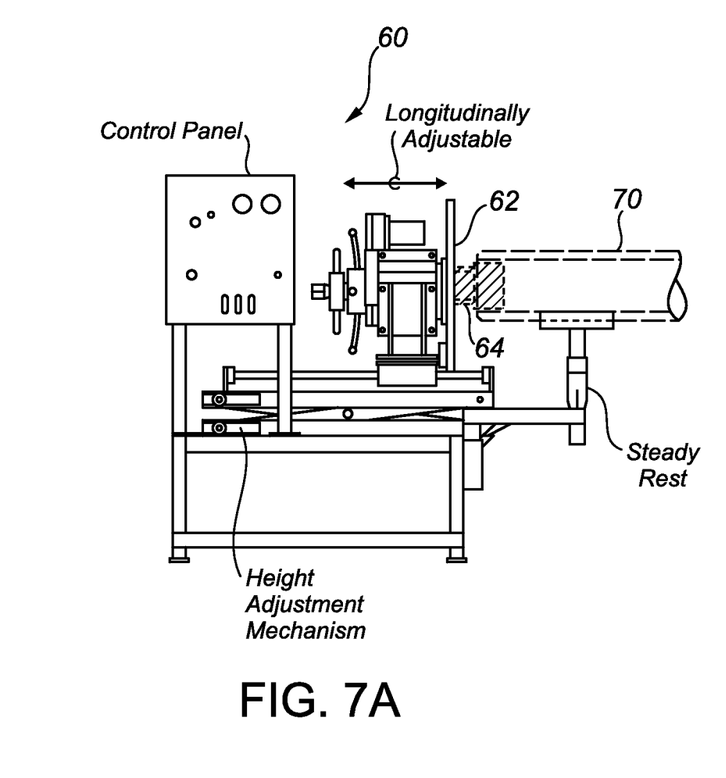
FIG. 7A is a side elevation of a prior art re-facing machine, shown with bevelling apparatus in accordance with the present disclosure mounted to the flange plate of the machine, and with a tubular workpiece in position for mounting to the mandrel of the re-facing machine.
Figure 7B:
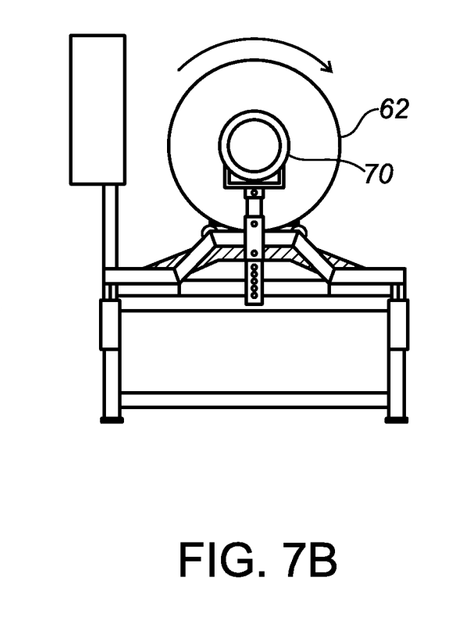
FIG. 7B is an end view of the assembly shown in FIG. 7A.

Bevelling apparatus 10 further includes a sliding block 30 having an outer end 30A and an inner end 30B, upper face 30U, lower face 30L, and side edges 31A and 31B. Formed in lower face 30L of sliding block 30, and extending between outer and inner ends 30A and 30B thereof, is a trapezoidal channel 36 configured for a close-tolerance sliding fit with raised section 24 of bracket assembly 20. Formed in upper face 30U of sliding block 30, and extending between outer and inner ends 30A and 30B thereof, is a two-section keyway 37 comprising a lower section 37L and a narrower upper section 37U. As may be best understood from FIG. 3, keyway 37 is configured to receive a tool holder 40 of known type, having an upper section 41 slidably disposable within upper section 37U of keyway 37, and a lower section 43 slidably disposable within lower section 37L of keyway 37. Tool holder 40 will typically be provided with one or more set screws 42 or other means for releasably fixing the longitudinal position of tool holder 40 relative to sliding block 30. A bevelling tool 42 with cutting element 44 may be mounted to tool holder 40 as seen in FIG. 1 (tool holder 40 not being visible in FIG. 1).

The width of sliding block 30 is such that it cannot impinge upon outer lug member 26 of bracket assembly 20, and such that its side edge 31B will at all times be clear of elongate slot 23 in base plate 24 (or at least will not overlap slot 23 so as to interfere with the operation of bevelling apparatus 10).

Figure 2:
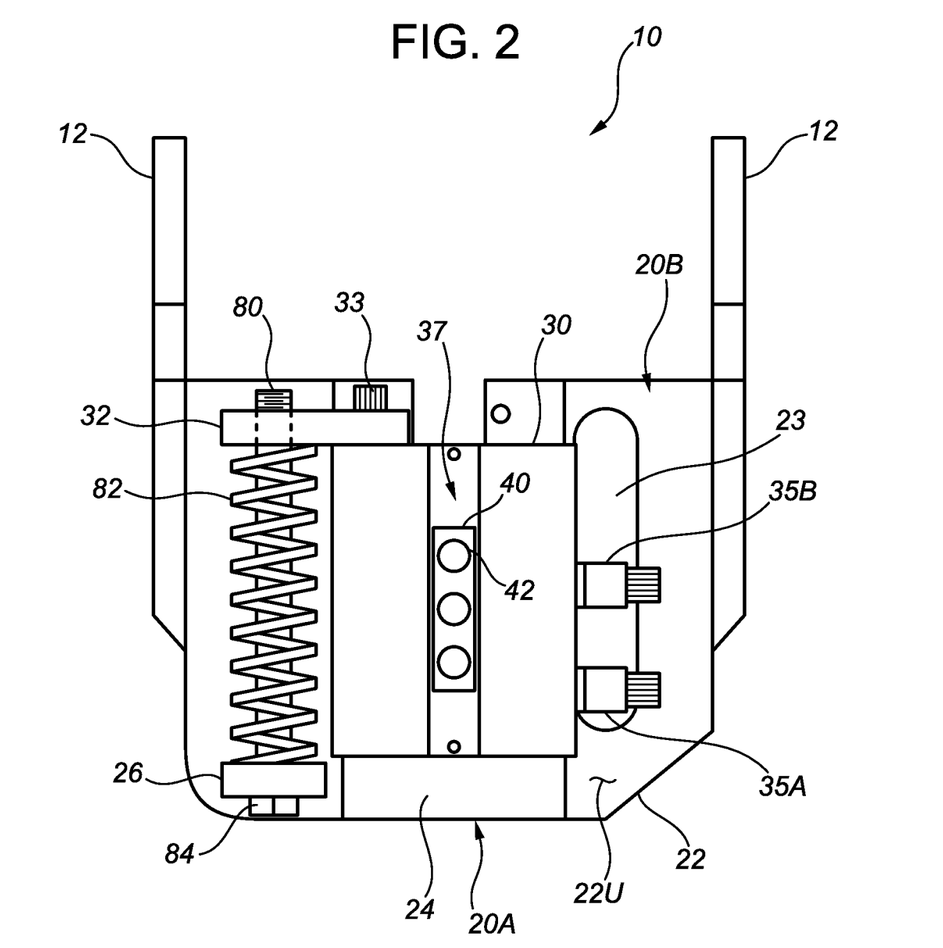
FIG. 2 is an oblique view of the bevelling apparatus illustrated in FIG. 1.

An inner lug member 32 having a threaded bore 32A is rigidly connected to inner end 30B of sliding block 30, such that the portion of inner lug member 32 in which threaded bore 32A is formed projects beyond side edge 31A of sliding block 30. When sliding block 30 is slidably engaged with raised portion 24 of bracket assembly 20 as previously described, threaded bore 32A of inner lug member 32 will be aligned with unthreaded bore 26A of outer lug member 26 of bracket assembly 20. As shown in FIG. 2, a helical spring 82 is positioned between inner lug member 32 and outer lug member 26, and then an adjustment bolt 80 (having drive head 84) is inserted through unthreaded bore 26A of outer lug member 26 and helical spring 82, whereupon the threaded end of bolt 80 engages threaded bore 32A of inner lug member 32. It may be readily understood, therefore, that the static longitudinal position of sliding block 30 relative to bracket assembly 20 can be adjusted by rotating drive head 84 as required. However, sliding block 30 will remain slidingly movable relative to bracket assembly 20 by a longitudinal force applied to sliding block 30 in the direction toward outer end 20A of bracket assembly 20, with helical spring 82 serving as a biasing means which will return sliding block 30 back toward its static position upon relaxation of the longitudinal force.

Inner lug member 32 may be connected to sliding block 30 by any suitable means such as welding or, alternatively, by means of one or more bolts 33 (or machine screws), for purposes of which inner lug member 32 may be provided with one or more bolt holes 32B as shown in FIG. 5A. Alternatively, inner lug member 32 may be formed integrally with sliding block 30.

Figure 3:
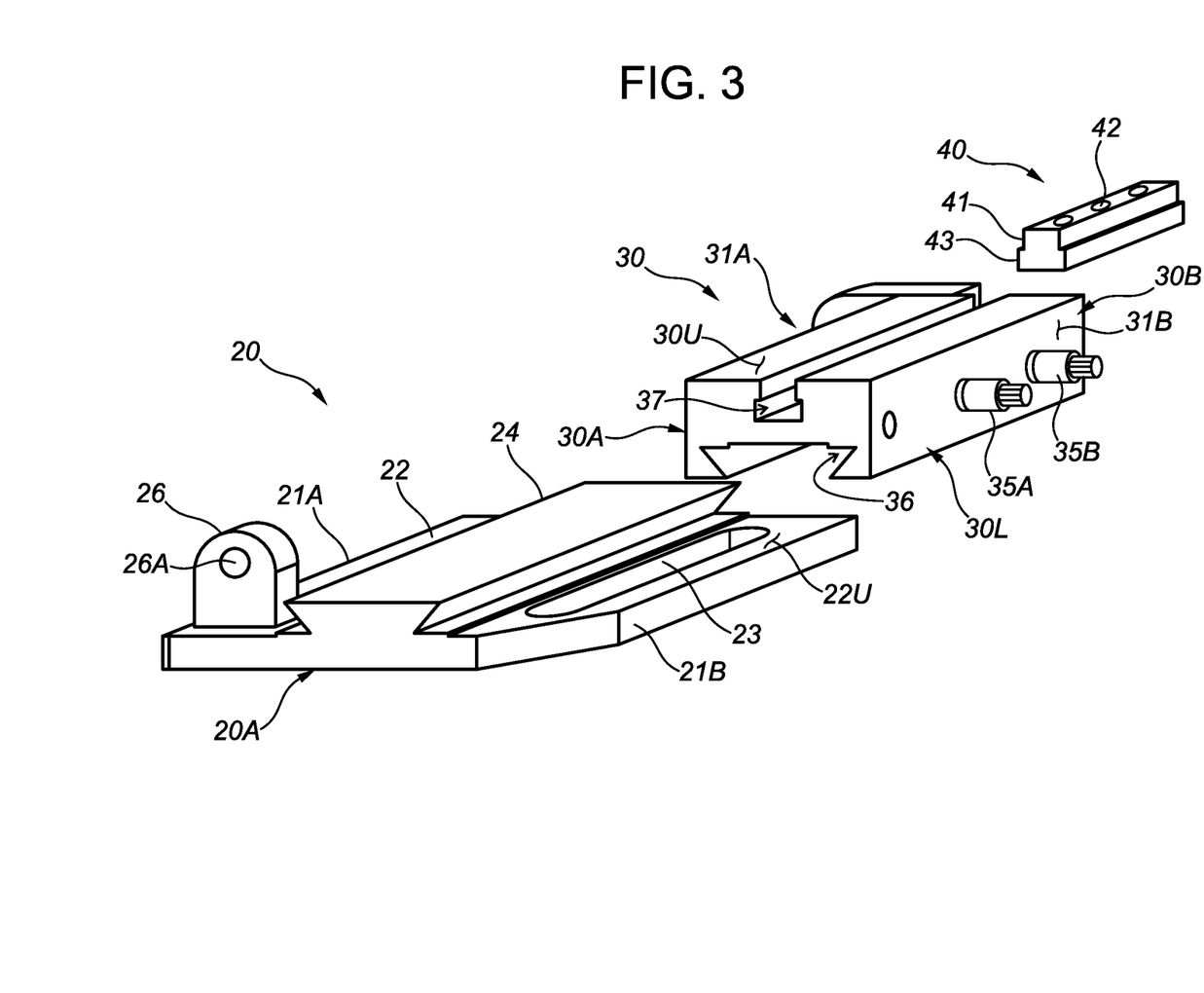
FIG. 3 is an exploded isometric view of selected components of the bevelling apparatus of FIG. 1.

As shown in FIGS. 1, 2, and 3, an outer roller 35A and an inner roller 35B are mounted to and extend laterally from side edge 30B of sliding block 30. Rollers 35A and 35B are spaced apart in the longitudinal direction, with the clear spacing between rollers 35A and 35B being set to suit the width of the actuator arm 54 of a tool slide bracket 50, as may be seen in FIGS. 1 and 6. Tool slide bracket 50 comprises a base member 52 adapted (such as by means of mounting holes 52A) for mounting to radial movement mechanism 65. Actuator arm 54 has an inner section 54A connected (such as by welding) to and projecting outward from base member 52, plus an outer section 54B which is angled, relative to base member 52, as appropriate to bevel a tubular workpiece 70 at a desired angle.

As may be seen in FIG. 1, when bevelling apparatus 10 is mounted in association with the flange plate 62 of a re-facing machine 60, with base member 52 of tool slide bracket 50 directly connected to radial movement mechanism 65, angled outer section 54B of actuator arm 54 is disposed (preferably with only nominal clearance) between rollers 35. When radial movement mechanism 65 is actuated, so as to move tool slide bracket 50 radially inward in the plane of flange plate 62, outer section 54B of actuator arm 54, due to its angular orientation, will bear against inner roller 35B, having the effect of applying a longitudinal force urging sliding block 30 toward outer end 20A of bracket assembly 20. As may be seen from FIG. 1, this will cause sliding block 30, and bevelling tool 42 in turn, to move both radially inward and at an acute angle relative to rotational axis A—more specifically, at an angle corresponding to the desired angle for the bevelled face to be machined on the end of workpiece 70. As sliding block 30 continues its inward movement, outer section 54B of actuator arm 54 will necessarily move between rollers 35A and 35B in the direction transverse to and toward base plate 22 of bracket assembly 20. It is for this reason that elongate slot 23 is provided in base plate 22, so that the free end of outer section 54B of actuator arm 54 can freely pass both transversely through and longitudinally along slot 23.

The operation and use of bevelling apparatus 10 may now be readily understood having regard to the preceding description. With a tubular workpiece 70 mounted to mandrel 64 as shown in FIG. 1 and longitudinally positioned as desired, the initial or static position of sliding block 30, and in turn the position of bevelling tool 42 relative to the end of workpiece 70, can be set as desired by appropriate rotation of adjustment bolt 80. Re-facing machine 60 can then be actuated so as to rotate flange plate 60 and bevelling apparatus 10. Actuation of radial movement mechanism 65 will then cause bevelling tool 42 to move toward workpiece 70 in a direction parallel to the desired bevel face plane. As bevelling tool 42 thus rotates around workpiece 70 and concurrently moves angularly inward, cutting element 44 will engage workpiece 70 and machine the desired bevelled shoulder edge.

Figure 8B:
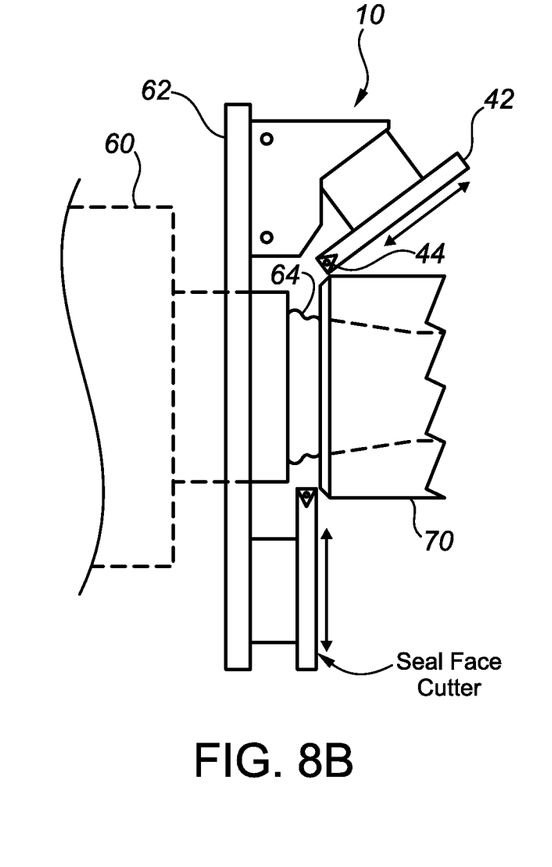
FIG. 8B is a schematic side view of a tubular workpiece mounted to a re-facing machine having a flange plate as in FIG. 8A, with both a seal face cutter and a bevel cutter mounted to the flange plate.

As schematically illustrated in FIG. 8B, bevelling apparatus in accordance with the present disclosure makes it possible to re-face the bevelled shoulder of a tubular workpiece 70 concurrently with re-facing of the seal face, using the same basic re-facing machine. This is possible because both operations are carried out without having to move or reposition workpiece 70 longitudinally relative to the re-facing machine. This provides a decided advantage over prior art methods and apparatus which require seal faces and bevelled shoulders to be re-faced in separate and sequential operations.

Figures 9, 9A, 9B:
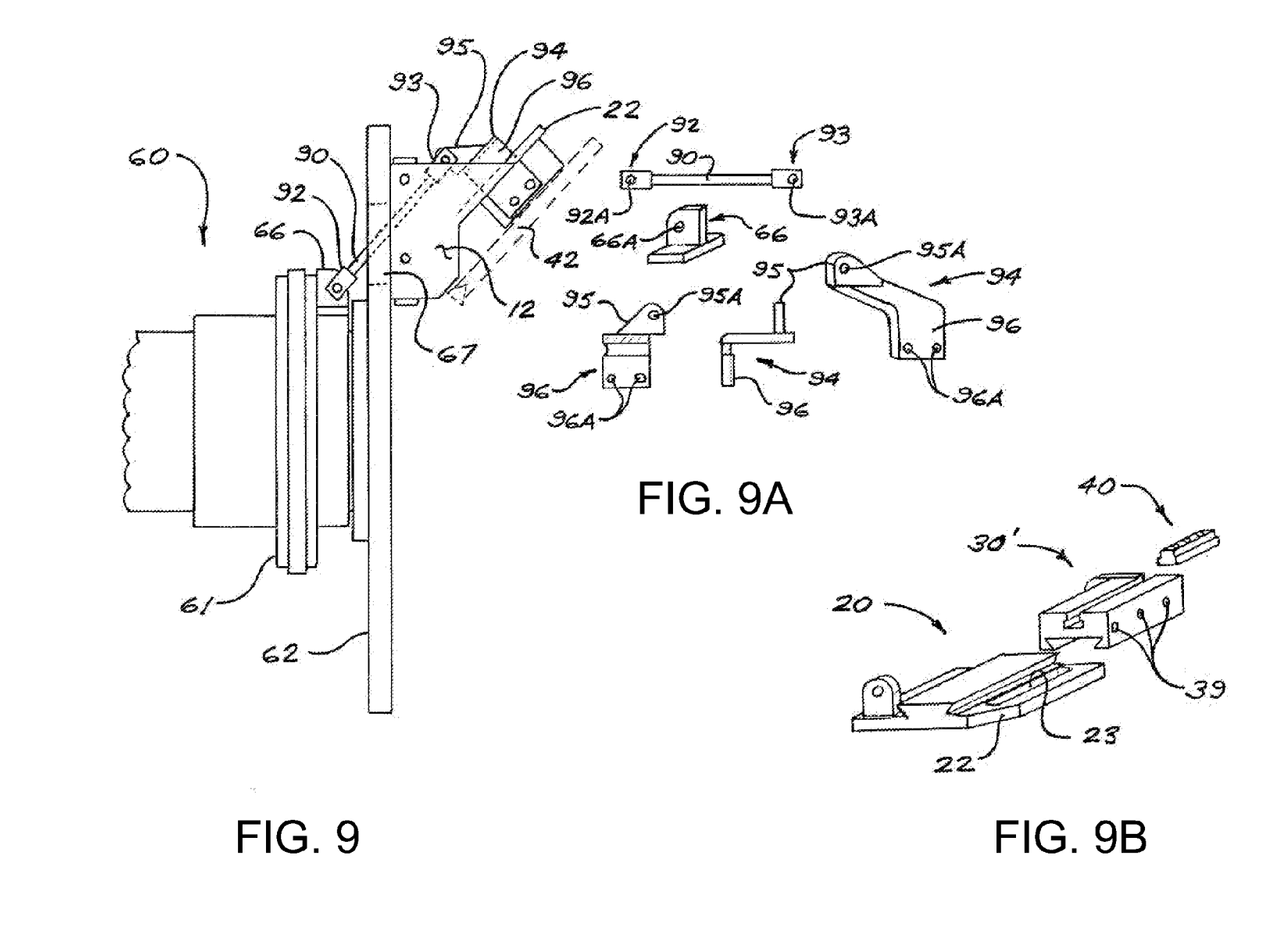
FIG. 9 is schematic side view of a second embodiment of a bevelling apparatus in accordance with a second embodiment of the present disclosure.
FIG. 9A illustrates various components of the alternative actuation mechanism of the embodiment illustrated in FIG. 9.
FIG. 9B is an exploded isometric view of selected components similar to FIG. 3, illustrating modifications for purposes of the alternative actuation mechanism as in FIG. 9.

FIG. 9 illustrates a second embodiment of the beveller that uses an alternative mechanism for effecting radial movement of a modified sliding block 30' and bevelling tool 42 relative to re-facing machine 60, instead of the wedge mechanism used in the prior art Blattner machine (per U.S. Pat. No. 4,149,436). Except as described herein and illustrated in FIGS. 9, 9A, and 9B, the details of the components of this alternative embodiment correspond to those in the previously described and illustrated embodiment.

The alternative embodiment of FIG. 9 includes a bracket 94 (illustrated in detail in FIG. 9A) which has a first flange 95 and a second flange 96. First flange 95 has a hole 95A for receiving a swivel pin. Second flange 96 extends through elongate slot 23 in base plate 22 and is securely mounted to sliding block 30'. As shown in FIG. 9B, sliding block 30' differs from sliding block 30 in FIG. 3 in that it does not include any rollers 35. In the illustrated alternative embodiment, the mounting of second flange 96 to sliding block 30' is accomplished by means of bolts or machine screws (not shown) through holes 96A in second flange 96 and into threaded holes 39 in one side of sliding block 30'. However, alternative means for securely mounting second flange 96 to sliding block 30' may be used instead of bolts or machine screws without departing from the scope of the present disclosure. Although bracket 94 is shown in FIG. 9A as being of generally Z-shaped configuration, this is by way of example only; bracket 94 could be of any functionally suitable shape and configuration, Referring to FIG. 9, re-facing machine 60 includes a collar assembly 61 (similar to collar (85) in U.S. Pat. No. 4,149,436) surrounding and rotating with a hollow shaft (not shown, but corresponding to hollow shaft (48) in U.S. Pat. No. 4,149,436), which in turn is disposed coaxially around non-rotating mandrel 64 (not shown in FIG. 9). Collar 61 is axially movable along the hollow shaft and relative to flange plate 62 of re-facing machine 60. Referring to FIG. 9A, a bracket 66 of any suitable configuration, with a hole 66A for receiving a swivel pin, is mounted to collar 61. A rigid bar 90 (of straight or other suitable configuration) has first and second ends 92 and 93, with associated holes 92A and 93A for receiving swivel pins.

Referring again to FIG. 9, rigid bar 90 is disposed through a radial slot 67 in flange plate 62, with first end 92 swivellingly mounted to bracket 66 by means of a swivel pin extending through holes 66A and 92A, and with second end 93 swivellingly mounted to first flange 95 of Z-shaped bracket 94 by means of a swivel pin extending through holes 93A and 95A. Accordingly, axial movement of collar 61 moved away from flange plate 62 will cause rigid bar 90 to pull sliding block 30' along raised section 24 of bracket assembly 20 toward flange plate 62, in an angular direction corresponding to the desired angle of bevel to be formed on a tubular workpiece 70 by bevelling tool 42 mounted to sliding block 30'. Therefore, angled movement of bevelling tool 42 relative to the end of a mounted workpiece 70 is effected by axial movement of collar 61, but the operative mechanism is the swivelling linkage provided by rigid bar 90 rather than a wedging mechanism.

Figure 10:
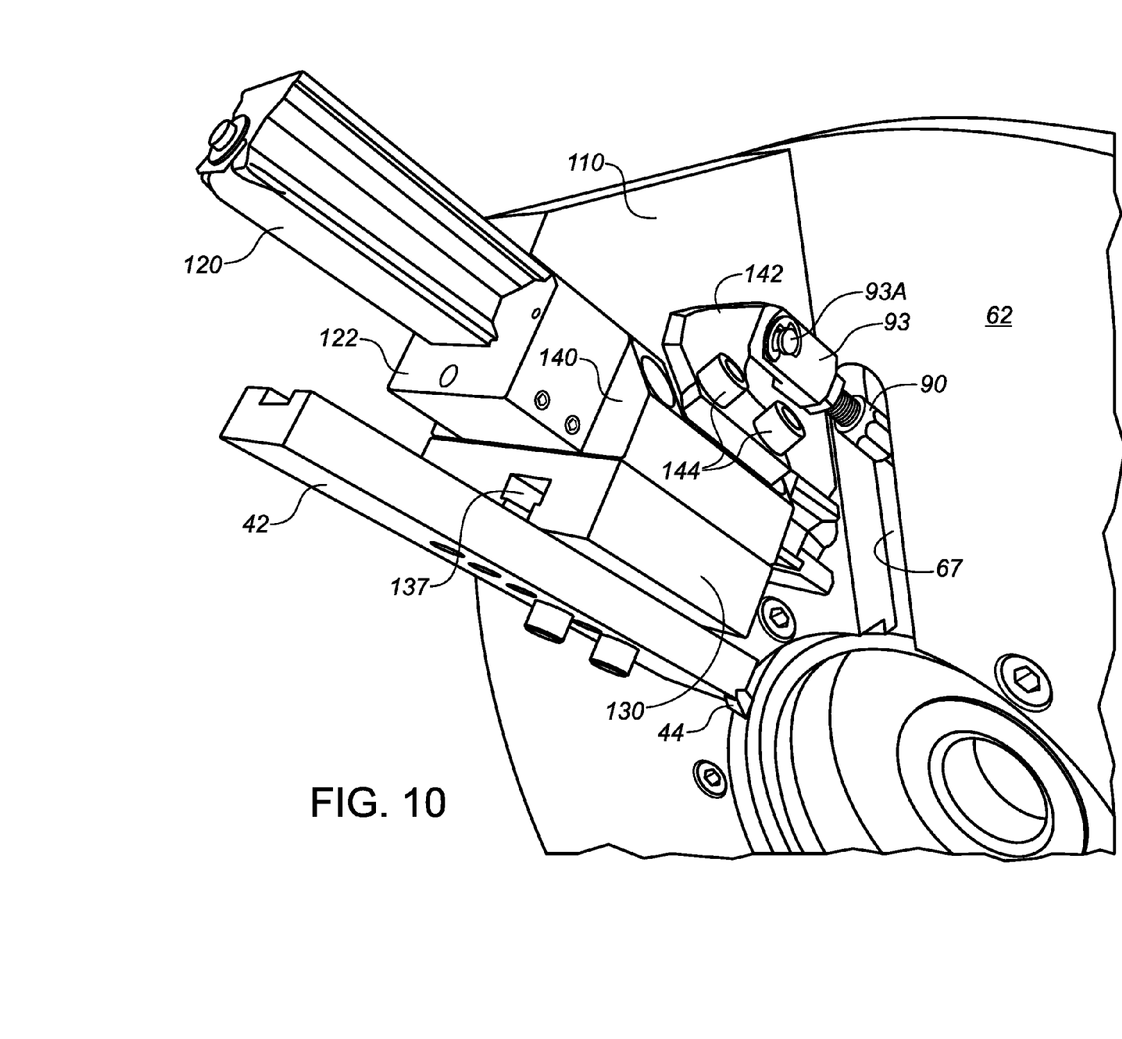
FIG. 10 is perspective view of a third embodiment of a bevelling apparatus in accordance with the present disclosure.

FIG. 10 illustrates a third embodiment of a bevelling apparatus in accordance with the present disclosure. In this embodiment, a bevelling tool 42 with cutting element 44 is carried by a tool holder 40 (not shown in FIG. 10) which is received a keyway 137 in a sliding block 130 (which is generally similar to sliding block 30 and sliding block 30' in the other illustrated embodiments). As shown in FIG. 10, sliding block 130 is secured to a runner block 122 which is longitudinally movable along a rail member 120, which in turn is secured to a rail-mounting block 110 secured to the rotatable face plate 62 of a re-facing machine 60, with the angle of rail member 120 relative to face plate 62 being selected to suit the angle of the bevelled shoulder to be re-faced using the apparatus.

An adapter block 140 is secured to either or both of runner block 122 and sliding block 130, and a bracket 142 (functionally analogous to bracket 94 in the embodiment in FIGS. 9 and 9A) is secured to adapter block 140. Movement of runner block 122 along rail member 120 is effected by means of an actuating mechanism essentially the same as the mechanism illustrated in FIGS. 9 and 9A and previously described herein. In other words, a rigid bar 90 is disposed through a radial slot 67 in face plate 62, with rigid bar 90 having a first end 92 (not shown in FIG. 10) swivellingly mounted to an axially-movable collar 61 associated with re-facing machine 60, and a second end 93 swivellingly mounted to bracket 142 by means of a swivel pin disposed through hole 93A in second end 93. Axial movement of collar 61 away from face plate 62 will cause rigid bar 90 to pull sliding block 130 along rail member 120 toward face plate 62, in an angular direction corresponding to the desired angle of bevel to be formed or re-faced on a tubular workpiece 70 by bevelling tool 42 mounted to sliding block 30'.

Runner block 122 and rail member 120 may be of any suitably mating configuration such that runner block 122 is retained on rail member 120 as it travels therealong. In the illustrated embodiment, runner block 122 and rail member 120 are shown, respectively, as runner block and ball guide rail components of a ball rail system as manufactured by Bosch Rexroth AG (details of which can be viewed at http://www.boschrexroth.com). However, this is by way of example only, and the embodiment shown FIG. 10 is not limited to the use of these or any other particular types of runner block and rail member. By way of non-limiting example, variant embodiments could use roller rail system components as manufactured by Bosch Rexroth AG, or could use custom-fabricated runner blocks and rail members. Movement of runner block 122 along rail member 120 could be sliding movement or rolling movement or a combination of sliding and rolling movement.

It will be readily appreciated by those skilled in the art that various modifications of the illustrated embodiments may be devised without departing from the scope and teaching of the present disclosure, including modifications which may use equivalent structures or materials hereafter conceived or developed. It is to be especially understood that the disclosure is not intended to be limited to any described or illustrated embodiment, and that the substitution of a variant of a claimed element or feature, without any substantial resultant change in the working of the apparatus, will not constitute a departure from the scope of the disclosure. It is to also be appreciated that the different teachings of the embodiments described and discussed herein may be employed separately or in any suitable combination to produce desired results.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "engage", "couple", "attach", "mount", "secure", or any other term describing an interaction between elements is not meant to limit the interaction to direct interaction between the subject elements, and may also include indirect interaction between the elements such as through secondary or intermediary structure.

Relational terms such as "parallel", "perpendicular", "coincident", "intersecting", and "equidistant" are not intended to denote or require absolute mathematical or geometrical precision. Accordingly, such terms are to be understood as denoting or requiring substantial precision only (e.g., "substantially parallel") unless the context clearly requires otherwise. Wherever used in this document, the terms "typical" and "typically" are to be interpreted in the sense of representative of common usage or practice, and are not to be understood as implying essentiality or invariability.

What is claimed is:

1. A bevelling apparatus, for use in association with a pipe-refacing machine of the type having:
    (a) a tubular shaft rotatable about a rotational axis;
    (b) a flange plate mounted to one end of the tubular shaft and rotatable therewith, said flange plate having an outer face perpendicular to the rotational axis and having an opening through which the rotational axis passes;
    (c) a stationary and non-rotatable adapter disposed at least partially within the tubular shaft proximal to the opening in the flange plate, for receiving a threaded end of a tubular workpiece such that the longitudinal axis of the workpiece is coincident with the rotational axis; and
    (d) a tubular collar coaxially disposed around the tubular shaft so as to be rotatable therewith and movable relative thereto in a direction parallel to the rotational axis;
wherein said bevelling apparatus comprises:
    (e) a support bracket mountable to the flange plate of a re-facing machine so as to project from the outer face of said flange plate;
    (f) a support block adapted to receive a tool holder, said support block being retainingly mounted to the support bracket so as to be movable relative to the support bracket in an angled radial direction forming an acute angle relative to a radially-outermost portion of the flange plate, with said acute angle corresponding to the bevel angle of a bevelled edge to be machined or re-faced on an annular shoulder of a tubular workpiece mounted to the adapter of the re-facing machine; and (g) actuating means for effecting angled radial movement of the support block relative to the support bracket.

2. The bevelling apparatus as in claim 1, wherein the support bracket comprises a base plate having a raised section contoured for sliding engagement with a mating recess in the support block.

3. The bevelling apparatus as in claim 2, wherein the raised section is in the form of a parallelepiped of trapezoidal cross-section.

4. The bevelling apparatus as in claim 1, wherein the support bracket comprises a contoured rail member oriented parallel to the desired bevel angle to be machined on an annular shoulder of a tubular workpiece, and wherein the support block comprises a runner block contoured for retainingly mating engagement with the rail member so as to be movable along the rail member.

5. The bevelling apparatus as in claim 1, wherein the actuating means comprises an actuator arm operatively engageable with the support block, said actuator arm being connected to a slide bracket extending through and radially movable within a radial slot through the flange plate, said slide bracket having a first wedge component operatively engageable with a second wedge component associated with the tubular collar of the re-facing machine, such that longitudinal movement of the tubular collar will cause the second wedge component to urge the first wedge component and the slide bracket in a radial direction, thereby causing the actuator arm to move the support block relative to the support bracket.

6. The bevelling apparatus as in claim 5, wherein the actuator arm has an angled outer section transversely movable between a pair of guide rollers associated with the support block.

7. The bevelling apparatus as in claim 1, wherein the actuating means comprises a rigid bar extending through a radial slot in the flange plate, said rigid bar being swivellingly mounted at one end to the support block and at the other end to the tubular collar, such that longitudinal movement of the tubular collar will move the support block relative to the support bracket.

8. The bevelling apparatus as in claim 1, further comprising biasing means biasing the support block in an angled radial direction away from the rotational axis.

9. The bevelling apparatus as in claim 8, wherein the biasing means comprises a helical spring.

10. In a pipe-refacing machine of the type having:
(a) a tubular shaft rotatable about a rotational axis;
(b) a flange plate mounted to one end of the tubular shaft and rotatable therewith, said flange plate having an outer face perpendicular to the rotational axis and having an opening through which the rotational axis passes;
(c) a stationary and non-rotatable adapter disposed at least partially within the tubular shaft proximal to the opening in the flange plate, for receiving a threaded end of a tubular workpiece such that the longitudinal axis of the workpiece is coincident with the rotational axis; and
(d) a tubular collar coaxially disposed around the tubular shaft so as to be rotatable therewith and movable relative thereto in a direction parallel to the rotational axis;

the improvement comprising:
(e) a support bracket projecting from the outer face of the flange plate;
(f) a support block adapted to receive a tool holder, said support block being retainingly mounted to the support bracket so as to be movable relative to the support bracket in an angled radial direction forming an acute angle relative to a radially-outermost portion of the flange plate, with said acute angle corresponding to the bevel angle of a bevelled edge to be machined or refaced on an annular shoulder of a tubular workpiece mounted to the adapter; and
(g) actuating means for effecting angled radial movement of the support block relative to the support bracket.

11. The improvement defined in claim 10, wherein the support bracket comprises a base plate having a raised section contoured for sliding engagement with a mating recess in the support block.

12. The improvement defined in claim 11, wherein the raised section is in the form of a parallelepiped of trapezoidal cross-section.

13. The improvement defined in claim 10, wherein the support bracket comprises a contoured rail member oriented parallel to the desired bevel angle to be machined on an annular shoulder of a tubular workpiece, and wherein the support block comprises a runner block contoured for retainingly mating engagement with the rail member so as to be movable along the rail member.

14. The improvement defined in claim 10, wherein the actuating means comprises an actuator arm operatively engageable with the support block, said actuator arm being connected to a slide bracket extending through and radially movable within a radial slot through the flange plate, said slide bracket having a first wedge component operatively engageable with a second wedge component associated with the tubular collar, such that longitudinal movement of the tubular collar will cause the second wedge component to urge the first wedge component and the slide bracket in a radial direction, thereby causing the actuator arm to move the support block relative to the support bracket.

15. The improvement defined in claim 14, wherein the actuator arm has an angled outer section transversely movable between a pair of guide rollers associated with the support block.

16. The improvement defined in claim 10, wherein the actuating means comprises a rigid bar extending through a radial slot in the flange plate, said rigid bar being swivellingly mounted at one end to the support block and at the other end to the tubular collar, such that longitudinal movement of the tubular collar will move the support block relative to the support bracket.

17. The improvement defined in claim 10, further comprising biasing means biasing the support block in an angled radial direction away from the rotational axis.

18. The improvement defined in claim 17, wherein the biasing means comprises a helical spring.

\* \* \* \* \*